(12) United States Patent
Lei et al.

(10) Patent No.: US 12,480,206 B2
(45) Date of Patent: Nov. 25, 2025

(54) ORGANOAMINODISILAZANES FOR HIGH TEMPERATURE ATOMIC LAYER DEPOSITION OF SILICON OXIDE THIN FILMS

(71) Applicant: VERSUM MATERIALS US, LLC, Tempe, AZ (US)

(72) Inventors: Xinjian Lei, Vista, CA (US); Ming Li, Tempe, AZ (US); Matthew R. Macdonald, Mission Viejo, CA (US); Meiliang Wang, Shanghai (CN)

(73) Assignee: Versum Materials US, LLC, Tempe, AZ (US)

(*) Notice: Subject to any disclaimer, the term of this patent is extended or adjusted under 35 U.S.C. 154(b) by 704 days.

(21) Appl. No.: 17/606,438

(22) PCT Filed: Apr. 17, 2020

(86) PCT No.: PCT/US2020/028691
§ 371 (c)(1),
(2) Date: Oct. 25, 2021

(87) PCT Pub. No.: WO2020/219349
PCT Pub. Date: Oct. 29, 2020

(65) Prior Publication Data
US 2022/0178028 A1 Jun. 9, 2022

Related U.S. Application Data

(60) Provisional application No. 62/838,854, filed on Apr. 25, 2019.

(51) Int. Cl.
| | | |
|---|---|---|
| C23C 16/00 | (2006.01) | |
| C01B 33/12 | (2006.01) | |
| C07F 7/10 | (2006.01) | |
| C23C 16/40 | (2006.01) | |
| C23C 16/44 | (2006.01) | |
| C23C 16/455 | (2006.01) | |

(52) U.S. Cl.
CPC ...... C23C 16/45553 (2013.01); C01B 33/126 (2013.01); C07F 7/10 (2013.01); C23C 16/401 (2013.01); C23C 16/4408 (2013.01); C23C 16/45536 (2013.01); C01P 2006/10 (2013.01); C01P 2006/80 (2013.01)

(58) Field of Classification Search
CPC ....... C01B 33/126; C07F 7/10; C01P 2006/80
USPC ...................................................... 106/287
See application file for complete search history.

(56) References Cited

U.S. PATENT DOCUMENTS

| | | | |
|---|---|---|---|
| 6,992,019 B2 | 1/2006 | Lee | |
| 2011/0054184 A1 | 3/2011 | Yoshida et al. | |
| 2011/0262642 A1 | 10/2011 | Xiao et al. | |
| 2012/0021127 A1 | 1/2012 | Sato | |
| 2013/0295779 A1* | 11/2013 | Chandra | H01L 21/0228 546/14 |
| 2014/0272194 A1* | 9/2014 | Xiao | C23C 16/24 427/255.394 |
| 2016/0365244 A1 | 12/2016 | Chandra et al. | |
| 2017/0207084 A1 | 7/2017 | O'Neill et al. | |
| 2019/0085452 A1 | 3/2019 | Lei et al. | |

FOREIGN PATENT DOCUMENTS

| | | |
|---|---|---|
| CN | 102827198 A | 12/2012 |
| CN | 103374708 A | 10/2013 |
| EP | 2278046 A | 1/2011 |
| EP | 2278046 A1 | 1/2011 |
| JP | 2010-103484 A | 5/2010 |
| JP | 2010225663 A | 10/2010 |
| JP | 2010275602 A | 12/2010 |

(Continued)

OTHER PUBLICATIONS

Hensen et al. (Zur Synthese einiger Siliciumstickstoffverbindungen. Zeitschrift fur anorganische und allgemeine Chemie, Dec. 31, 1970, vol. 379, No. 1, pp. 40-43 (Year: 1970).*
Wannagat et al. (Zur Umsetzung von metallierten (Di)Alkylaminosiylaminen mit Chlorsilanen). Manatshefte fur Chemie, 99, 1376-1382 (1986); as supplied by applicants) (Year: 1986).*
Wannagat et al. (Zur Umsetzung von metallierten (Di)Alkylaminosiylaminen mit Chlorsilanen). Manatshefte fur Chemie, 99, 1376-1382 (1986) (Year: 1986).*
International Search Report for PCT/US2020/028691.
Wannagat, U. et al., Zur Umsetzung von metallierten (Di) Alkylaminosilylaminen mit Chlorsilanen. Monatshefte fur Chemie, Jul. 31, 1968, vol. 99, pp. 1376-1382 (DOI: 10.1007/BF00902682).
Hensen, V. K. et al., Zur Synthese einiger Siliciumstickstoffverbindungen. Zeitschrift für anorganische und allgemeine Chemie, Dec. 31, 1970, vol. 379, No. 1, pp. 40-43 (DOI: 10.1002/ZAAC.19703790107).

(Continued)

*Primary Examiner* — James E Mcdonough
(74) *Attorney, Agent, or Firm* — David K. Benson; Versum Materials US, LLC

(57) ABSTRACT

An atomic layer deposition (ALD) process for formation of silicon oxide at a temperature greater than 500° C. is performed using at least one organoaminodisilazane precursor having the following Formula I:

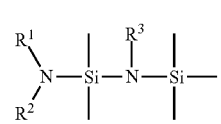

wherein $R^1$ and $R^2$ are each independently selected from hydrogen, a linear or branched $C_1$ to $C_{10}$ alkyl group, and a $C_6$ to $C_{10}$ aryl group with a proviso that $R^1$ and $R^2$ cannot be both hydrogen; $R^3$ is selected from hydrogen, a linear or branched $C_1$ to $C_{10}$ alkyl group, and a $C_6$ to $C_{10}$ aryl group; and either $R^1$ and $R^2$ are linked to form a cyclic ring structure or $R^1$ and $R^2$ are not linked to form a cyclic ring structure.

8 Claims, No Drawings

(56) References Cited

FOREIGN PATENT DOCUMENTS

| JP | 2011049468 A | 3/2011 | |
|---|---|---|---|
| JP | 2013236073 A | 11/2013 | |
| JP | 2018146686 A * | 9/2018 | ............... B05D 7/24 |
| WO | 2018182309 A1 | 10/2018 | |

OTHER PUBLICATIONS

Blaszczyk-Lezak, I., et al: "Silicon Carbonitride Films Produced By Remote Hydrogen Microwave Plasma CVD Using a (Dimethylamino) Dimethylsilane Precursor", Chemical Vapor Deposition, Wiley-VCH Verlag, Weinheim, DE, vol. 11, No. 1, Jan. 1, 2005 (Jan. 1, 2005), pp. 44-52, XP001225058, ISSN: 0948-1907, DOI: 10.1002/CVDE.200406316.

* cited by examiner

ORGANOAMINODISILAZANES FOR HIGH TEMPERATURE ATOMIC LAYER DEPOSITION OF SILICON OXIDE THIN FILMS

CROSS REFERENCE TO RELATED APPLICATIONS

This application is a National Stage filing under 35 U.S.C. 371 of International Patent Application No. PCT/US2020/028691 filed Apr. 17, 2020, which claims priority to the U.S. Application No. 62/838,854 filed on Apr. 25, 2019. The entire contents of these applications are incorporated herein by reference in their entirety.

BACKGROUND OF THE INVENTION

Described herein is a composition and method for the formation of a silicon oxide film. More specifically, described herein is a composition and method for formation of a silicon oxide film at one or more deposition temperatures of about 500° C. or greater and using an atomic layer deposition (ALD) process.

Thermal oxidation is a process commonly used to deposit high purity and highly conformal silicon oxide films such as silicon dioxide ($SiO_2$) in semiconductor applications. However, the thermal oxidation process has a very low deposition rate, e.g. less than 0.03 Å/s at 700° C. which makes it impractical for high volume manufacturing processes (see, for example, Wolf, S., "Silicon Processing for the VLSI Era Vol. 1—Process Technology", Lattice Press, C A, 1986).

Atomic Layer Deposition (ALD) and Plasma Enhanced Atomic Layer Deposition (PEALD) are processes used to deposit silicon dioxide ($SiO_2$) conformal films at low temperature (<500° C.). In both ALD and PEALD processes, the precursor and reactive gas (such as oxygen or ozone) are separately pulsed in certain number of cycles to form a monolayer of silicon dioxide ($SiO_2$) at each cycle. However, silicon dioxide ($SiO_2$) deposited at low temperatures using these processes may contain levels of impurities such as carbon (C), nitrogen (N), or both which are detrimental to semiconductor applications. To remedy this, one possible solution would be to increase the deposition temperature to 500° C. or greater. However, at these higher temperatures, conventional precursors employed by semi-conductor industries tend to self-react, thermally decompose, and deposit in chemical vapor deposition (CVD) mode rather than ALD mode. The CVD mode deposition has reduced conformality compared to ALD deposition, especially in high aspect ratio structures in semiconductor applications. In addition, the CVD mode deposition provides less control of the film or material thickness than does the ALD mode deposition.

JP2010275602 and JP2010225663 disclose the use of a raw material to form a Si containing thin film such as silicon oxide by a chemical vapor deposition (CVD) process at a temperature range of from 300-500° C. The raw material is an organic silicon compound, represented by formula: (a) $HSi(CH_3)(R^1)(NR^2R^3)$, wherein, $R^1$ represents $NR^4R^5$ or a 1 C-5 C alkyl group; $R^2$ and $R^4$ each represent a 1 C-5 C alkyl group or hydrogen atom; and $R^3$ and $R^5$ each represent a 1 C-5 C alkyl group; or (b) $HSiCl(NR^1R^2)(NR^3R^4)$, wherein $R^1$ and $R^3$ independently represent an alkyl group having 1 to 4 carbon atoms, or a hydrogen atom; and $R^2$ and $R^4$ independently represent an alkyl group having 1 to 4 carbon atoms. The organic silicon compounds have H—Si bonds U.S. Pat. No. 7,084,076 discloses a halogenated siloxane such as hexachlorodisiloxane (HCDSO) that is used in conjunction with pyridine as a catalyst for ALD deposition below 500° C. to form silicon dioxide.

U.S. Pat. No. 6,992,019 discloses a method for catalyst-assisted atomic layer deposition (ALD) to form a silicon dioxide layer having superior properties on a semiconductor substrate by using a first reactant component consisting of a silicon compound having at least two silicon atoms, or using a tertiary aliphatic amine as the catalyst component, or both in combination, together with related purging methods and sequencing. The precursor used is hexachlorodisilane. The deposition temperature is between 25-150° C.

U.S. Pat. No. 9,460,912 discloses a method for the formation of a silicon oxide containing film at one or more deposition temperature of about 500 degrees centigrade. In one aspect, the composition and process use one or more silicon precursors selected from compounds having the following formulae I, II, described and combinations thereof $R^1R^2{}_mSi(NR^3R^4)_nX_p$ (I); $R^1R^2{}_mSi(OR^3)_n(OR^4)_qX_p$ (II).

There is a need to develop a process for forming a high quality, low impurity, high conformal silicon oxide film using an atomic layer deposition (ALD) process or an ALD-like process, such as without limitation a cyclic chemical vapor deposition process, to replace thermal-based deposition processes. Further, it may be desirable to develop a high temperature deposition (e.g., deposition at one or more temperatures of 500° C.) to improve one or more film properties, such as purity and/or density, in an ALD or ALD-like process.

BRIEF SUMMARY OF THE INVENTION

Described herein is a process for the deposition of a silicon oxide material or film at high temperatures, e.g., at one or more temperatures of 500° C. or greater, in an atomic layer deposition (ALD) or an ALD-like process.

One embodiment provides a process to deposit silicon oxide comprising steps of:
  a. providing a substrate in a reactor;
  b. introducing into the reactor at least one organoaminodisilazane precursor;
  c. purging the reactor with purge gas;
  d. introducing an oxygen source into the reactor; and
  e. purging the reactor with purge gas;
wherein steps b through e are repeated until a desired thickness of silicon oxide is deposited; and wherein the process is conducted at one or more temperatures ranging from 500 to 800° C. and at one or more pressures ranging from 50 miliTorr (mT) to 760 Torr.

Another embodiment provides a process to deposit silicon oxide comprising steps of:
  a. providing a substrate in a reactor;
  b. introducing into the reactor at least one organoaminodisilazane precursor;
  c. purging the reactor with purge gas;
  d. introducing an oxygen source into the reactor;
  e. purging the reactor with purge gas;
  f. introducing water vapor or a hydroxyl source into the reactor; and
  g. purging the reactor with purge gas;
wherein steps b through g are repeated until a desired thickness of silicon oxide is deposited; and wherein the process is conducted at one or more temperatures ranging from 500 to 800° C. and at one or more pressures ranging from 50 miliTorr (mT) to 760 Torr. In this or other embodiments, the oxygen source is selected from the group consisting of oxygen, oxygen plasma, water vapor, water vapor plasma, hydrogen peroxide, nitrogen oxides, and ozone.

For each of the above methods, the at least one organoaminodisilazane precursor described herein is selected from the group consisting of:

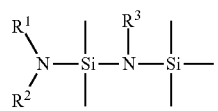

wherein $R^1$ and $R^2$ are each independently selected from hydrogen, a linear or branched $C_1$ to $C_{10}$ alkyl group, a $C_3$ to $C_{10}$ cyclic alkyl group, and a $C_6$ to $C_{10}$ aryl group; $R^3$ is selected from hydrogen, a linear or branched $C_1$ to $C_{10}$ alkyl group, and a $C_6$ to $C_{10}$ aryl group with a proviso that $R^1$ and $R^2$ cannot be both hydrogen; wherein $R^1$ and $R^2$ are linked to form a cyclic ring structure or $R^1$ and $R^2$ are not linked to form a cyclic ring structure; In one or more embodiments described above, the purge gas is selected from the group consisting of nitrogen, helium, argon and combination thereof.

In one or more embodiments described above, the oxygen source is selected from the group consisting of oxygen, a composition comprising oxygen and hydrogen, oxygen plasma, water vapor, water vapor plasma, hydrogen peroxide, nitrous oxide, ozone and combination thereof.

DETAILED DESCRIPTION OF THE INVENTION

Described herein are compositions and processes related to the formation of a silicon oxide containing film, such as a silicon oxynitride film, a stoichiometric or non-stoichiometric silicon oxide film, a silicon oxide film or combinations thereof with one or more temperatures of 500° C. or greater, in an ALD or in an ALD-like process, such as without limitation a cyclic chemical vapor deposition process (CCVD).

Typical ALD processes in the prior art use an oxygen source, or oxidizer such as oxygen, a composition comprising oxygen and hydrogen, oxygen plasma, water vapor, water vapor plasma, hydrogen peroxide, nitrous oxide, and ozone directly to form silicon oxide at process temperatures ranging from 25 to 500° C. The deposition steps comprise:
  a. providing a substrate in a reactor
  b. introducing into the reactor an organoaminodisilazane
  c. purging the reactor with purge gas
  d. introducing oxygen source into the reactor; and
  e. purging the reactor with purge gas.
In the prior art process, steps b through e are repeated until desired thickness of film is deposited It is believed that a high temperature process, above 500° C., preferably above 600° C., most preferably above 650° C. may yield better film quality in term of film purity and density. ALD process provides good film step coverage. However, typical organosilicon precursors used in ALD or PEALD only deposit films in ALD mode within a certain temperature range. When temperature is higher than this range, thermal decomposition of the precursor occurs which causes either a gas phase reaction or a continuous substrate surface reaction which changes the deposition process to CVD mode, rather than the desired ALD mode.

Not being bound by theory, for ALD or ALD-like deposition processes at one or more temperatures greater than 500° C., or greater than 600° C., or greater than 650° C., the organoaminodisilazane molecules described herein should have at least one anchoring functionality, which reacts with certain reactive sites on the substrate surface to anchor a monolayer of silicon species. The anchoring functionalities can be selected from an organoamino group, preferably a smaller amino-group such as dimethylamino, ethylmethylamino or diethylamino groups because a smaller organoamino group allows the organoaminodisilazanes to have low boiling points and higher reactivity. The organoaminodisilazane should also have a passive functionality in that it is chemically stable to prevent a further surface reaction, leading to a self-limiting process. The passivating functionality is selected from different alkyl groups such as methyl, ethyl, and phenyl groups, preferably a methyl group. The remaining groups on the surface can then be oxidized to form a Si—O—Si linkage as well as hydroxyl groups. In addition, hydroxyl sources such as $H_2O$ or water plasma can also be introduced into the reactor to form more hydroxyl groups as reactive sites for the next ALD cycle.

In one embodiment, the at least one organoaminodisilazane precursor described herein is represented by formula (I):

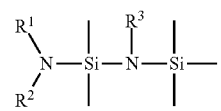

wherein $R^1$ and $R^2$ are each independently selected from hydrogen, a linear or branched $C_1$ to $C_{10}$ alkyl group, a $C_3$ to $C_{10}$ cyclic alkyl group, and a $C_6$ to $C_{10}$ aryl group; $R^3$ is selected from hydrogen, a linear or branched $C_1$ to $C_{10}$ alkyl group, and a $C_6$ to $C_{10}$ aryl group with a proviso that $R^1$ and $R^2$ cannot be both hydrogen; wherein $R^1$ and $R^2$ are linked to form a cyclic ring structure or $R^1$ and $R^2$ are not linked to form a cyclic ring structure In one preferred embodiment, the at least one organoaminodisilazane precursor described herein is represented by formula (IA):

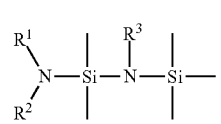

wherein $R^1$ and $R^2$ are selected from $C_1$ to $C_6$ alkyl group; $R^3$ is selected from hydrogen, a linear or branched $C_1$ to $C_6$ alkyl group, and a $C_6$ to $C_{10}$ aryl group; wherein $R^1$ and $R^2$ are linked to form a cyclic ring structure or $R^1$ and $R^2$ are not linked to form a cyclic ring structure.

In the formulas above and throughout the description, the term "alkyl" denotes a linear or branched functional group having from 1 to 10, 3 to 10, or 1 to 6 carbon atoms. Exemplary linear alkyl groups include, but are not limited to, methyl, ethyl, n-propyl (n-Pr or $Pr^n$), n-butyl, n-pentyl, and n-hexyl groups. Exemplary branched alkyl groups include, but are not limited to, iso-propyl (i-Pr or $Pr^i$), isobutyl (i-Bu or $Bu^i$), sec-butyl (s-Bu or $Bu^s$, tert-butyl (t-Bu or $Bu^t$, iso-pentyl, tert-pentyl, isohexyl, and neohexyl.

In certain embodiments, the alkyl group may have one or more functional groups such as, but not limited to, an alkoxy group, a dialkylamino group or combinations thereof, attached thereto. In other embodiments, the alkyl group does not have one or more functional groups attached thereto. The alkyl group may be saturated or, alternatively, unsaturated.

In the formulae above and throughout the description, the term "cyclic alkyl" denotes a cyclic functional group having from 3 to 10 carbon atoms. Exemplary cyclic alkyl groups include, but are not limited to, cyclobutyl, cyclopentyl, cyclohexyl, and cyclooctyl groups.

In the formulas above and throughout the description, the term "aryl" denotes an aromatic cyclic functional group having from 3 to 10 carbon atoms, from 5 to 10 carbon atoms, or from 6 to 10 carbon atoms. Exemplary aryl groups include, but are not limited to, phenyl, benzyl, chlorobenzyl, tolyl, and o-xylyl.

In certain embodiments, substituents $R^1$ and $R^2$ in Formula I can be linked together to form a ring structure. As the skilled person will understand, where $R^1$ and $R^2$ are linked together to form a ring $R^1$ will include a bond for linking to $R^2$ and vice versa. In these embodiments, the ring structure can be unsaturated such as a cyclic alkyl ring, or saturated such as an aryl ring. Further, in these embodiments, the ring structure can also be substituted or unsubstituted. Exemplary cyclic ring groups include, but are not limited to, pyrrolidino, 2-methylpyrrolidino, 2,5,-dimethylpyrrolidino, piperidino, 2,6-dimethylpiperidino, pyrrolyl, and imidazolyl groups. In other embodiments, however, substituents $R^1$ and $R^2$ are not linked.

In certain embodiments, the silicon films deposited using the methods described herein are formed in the presence of oxygen using an oxygen source, reagent or precursor comprising oxygen. An oxygen source may be introduced into the reactor in the form of at least one oxygen source and/or may be present incidentally in the other precursors used in the deposition process. Suitable oxygen source gases may include, for example, water ($H_2O$) (e.g., deionized water, purifier water, and/or distilled water), oxygen ($O_2$), oxygen plasma, ozone ($O_3$), $N_2O$, $NO_2$, carbon monoxide (CO), carbon dioxide ($CO_2$) and combinations thereof. In certain embodiments, the oxygen source comprises an oxygen source gas that is introduced into the reactor at a flow rate ranging from about 1 to about 2000 standard cubic centimeters (sccm) or from about 1 to about 1000 sccm. The oxygen source can be introduced for a time that ranges from about 0.1 to about 100 seconds. In one particular embodiment, the oxygen source comprises water having a temperature of 10° C. or greater. In embodiments wherein the film is deposited by an ALD or a cyclic CVD process, the precursor pulse can have a pulse duration that is greater than 0.01 seconds, and the oxygen source can have a pulse duration that is less than 0.01 seconds, while the water pulse duration can have a pulse duration that is less than 0.01 seconds. In yet another embodiment, the purge duration between the pulses that can be as low as 0 seconds or is continuously pulsed without a purge in-between. The oxygen source or reagent is provided in a molecular amount less than a 1:1 ratio to the silicon precursor, so that at least some carbon is retained in the as deposited dielectric film.

In certain embodiments, the silicon oxide films further comprise nitrogen. In these embodiments, the films are deposited using the methods described herein and formed in the presence of a nitrogen-containing source. A nitrogen-containing source may be introduced into the reactor in the form of at least one nitrogen source gas and/or may be present incidentally in the other precursors used in the deposition process. Suitable nitrogen-containing source gases may include, for example, ammonia, hydrazine, monoalkylhydrazine, dialkylhydrazine, nitrogen, nitrogen/hydrogen, ammonia plasma, nitrogen plasma, nitrogen/hydrogen plasma, and mixtures thereof. In certain embodiments, the nitrogen-containing source comprises an ammonia plasma or hydrogen/nitrogen plasma source gas that is introduced into the reactor at a flow rate ranging from about 1 to about 2000 square cubic centimeters (sccm) or from about 1 to about 1000 sccm. The nitrogen-containing source can be introduced for a time that ranges from about 0.1 to about 100 seconds. In embodiments wherein the film is deposited by an ALD or a cyclic CVD process, the precursor pulse can have a pulse duration that is greater than 0.01 seconds, and the nitrogen-containing source can have a pulse duration that is less than 0.01 seconds, while the water pulse duration can have a pulse duration that is less than 0.01 seconds. In yet another embodiment, the purge duration between the pulses that can be as low as 0 seconds or is continuously pulsed without a purge in-between.

The deposition methods disclosed herein may involve one or more purge gases. A purge gas, which is used to purge away unconsumed reactants and/or reaction byproducts, is an inert gas that does not react with the precursors. Exemplary purge gases include, but are not limited to, argon (Ar), nitrogen ($N_2$), helium (He), neon, hydrogen ($H_2$), and mixtures thereof. In certain embodiments, a purge gas such as Ar is supplied into the reactor at a flow rate ranging from about 10 to about 2000 sccm for about 0.1 to 1000 seconds, thereby purging the unreacted material and any byproduct that may remain in the reactor.

The respective step of supplying the precursors, oxygen source, the nitrogen-containing source, and/or other precursors, source gases, and/or reagents may be performed by changing the time for supplying them to change the stoichiometric composition of the resulting dielectric film.

Energy is applied to the at least one of the silicon precursor, oxygen containing source, or combination thereof to induce reaction and to form the dielectric film or coating on the substrate. Such energy can be provided by, but not limited to, thermal, plasma, pulsed plasma, helicon plasma, high density plasma, inductively coupled plasma, X-ray, e-beam, photon, remote plasma methods, and combinations thereof. In certain embodiments, a secondary RF frequency source can be used to modify the plasma characteristics at the substrate surface. In embodiments wherein the deposition involves plasma, the plasma-generated process may comprise a direct plasma-generated process in which plasma is directly generated in the reactor, or alternatively a remote plasma-generated process in which plasma is generated outside of the reactor and supplied into the reactor.

The at least one silicon precursors may be delivered to the reaction chamber such as a cyclic CVD or ALD reactor in a variety of ways. In one embodiment, a liquid delivery system may be utilized. In an alternative embodiment, a combined liquid delivery and flash vaporization process unit may be employed, such as, for example, the turbo vaporizer manufactured by MSP Corporation of Shoreview, MN, to enable low volatility materials to be volumetrically delivered, which leads to reproducible transport and deposition without thermal decomposition of the precursor. In liquid delivery formulations, the precursors described herein may be delivered in neat liquid form, or alternatively, may be employed in solvent formulations or compositions comprising same. Thus, in certain embodiments the precursor formulations may include solvent component(s) of suitable character as may be desirable and advantageous in a given end use application to form a film on a substrate.

For those embodiments wherein the at least one organoaminodisilazane precursor(s) having Formula I or IA is used in a composition comprising a solvent and an at least one organoaminodisilazane precursor having Formula I or IA described herein, the solvent or mixture thereof selected does not react with the silicon precursor. The amount of solvent by weight percentage in the composition ranges from 0.5% by weight to 99.5% or from 10% by weight to 75%. In this or other embodiments, the solvent has a boiling point (b.p.) similar to the b.p. of the at least one organoaminodisilazane precursor of Formula I or the difference between the b.p. of the solvent and the b.p. of the at least one organoaminodisilazane precursor of Formula I is 40° C. or less, 30° C. or less, or 20° C. or less, or 10° C. or less. Alternatively, the difference between the boiling points ranges from any one or more of the following end-points: 0, 10, 20, 30, or 40° C. Examples of suitable ranges of b.p. difference include without limitation, 0 to 40° C., 20° to 30° C., or 10° to 30° C. Examples of suitable solvents in the compositions include, but are not limited to, an ether (such as 1,4-dioxane, dibutyl ether), a tertiary amine (such as pyridine, 1-methylpiperidine, 1-ethylpiperidine, N,N'-dimethylpiperazine, N,N,N',N'-tetramethylethylenediamine), a nitrile (such as benzonitrile), an alkane (such as octane, nonane, dodecane, ethylcyclohexane), an aromatic hydrocarbon (such as toluene, mesitylene), a tertiary aminoether (such as bis(2-dimethylaminoethyl) ether), or mixtures thereof.

As previously mentioned, the purity level of the at least one organoaminodisilazane precursor of Formula I is sufficiently high enough to be acceptable for reliable semiconductor manufacturing. In certain embodiments, the at least one organoaminodisilazane precursor of Formula I described herein comprise less than 2% by weight, or less than 1% by weight, or less than 0.5% by weight of one or more of the following impurities: free amines, free halides or halogen ions, and higher molecular weight species. Higher purity levels of the organoaminodisilazane described herein can be obtained through one or more of the following processes: purification, adsorption, and/or distillation.

In one embodiment of the method described herein, a cyclic deposition process such as ALD-like, ALD, or PEALD may be used wherein the deposition is conducted using the at least one organoaminodisilazane precursor of Formula I and an oxygen source. The ALD-like process is defined as a cyclic CVD process but still provides high conformal silicon oxide films.

In certain embodiments, the gas lines connecting from the precursor canisters to the reaction chamber are heated to one or more temperatures depending upon the process requirements and the container of the at least one organoaminodisilazane precursor of Formula I is kept at one or more temperatures for bubbling. In other embodiments, a solution comprising the at least one organoaminodisilazane precursor of Formula I is injected into a vaporizer kept at one or more temperatures for direct liquid injection.

A flow of argon and/or other gas may be employed as a carrier gas to help deliver the vapor of the at least one organoaminodisilazane precursor of Formula I to the reaction chamber during the precursor pulsing. In certain embodiments, the reaction chamber process pressure is about 1 Torr.

In a typical ALD or an ALD-like process such as a CCVD process, the substrate such as a silicon oxide substrate is heated on a heater stage in a reaction chamber that is exposed to the organoaminodisilazane initially to allow the complex to chemically adsorb onto the surface of the substrate.

A purge gas such as argon purges away unabsorbed excess complex from the process chamber. After sufficient purging, an oxygen source may be introduced into reaction chamber to react with the absorbed surface followed by another gas purge to remove reaction by-products from the chamber. The process cycle can be repeated to achieve the desired film thickness. In some cases, pumping can replace a purge with inert gas or both can be employed to remove unreacted silicon precursors.

In this or other embodiments, it is understood that the steps of the methods described herein may be performed in a variety of orders, may be performed sequentially, may be performed concurrently (e.g., during at least a portion of another step), and any combination thereof. The respective step of supplying the precursors and the oxygen source gases may be performed by varying the duration of the time for supplying them to change the stoichiometric composition of the resulting dielectric film.

One particular embodiment of the method described herein to deposit a silicon oxide film on a substrate comprises the following steps:

a. providing a substrate in a reactor b. introducing into the reactor at least one organoaminodisilazane precursor described herein having Formula I c. purging the reactor with purge gas d. introducing oxygen source into the reactor and e. purging the reactor with purge gas wherein steps b through e are repeated until a desired thickness of the silicon oxide film is deposited.

In one particular embodiment of the method and composition described herein, the organoaminodisilazane is a compound having the following Formula IA:

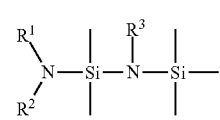

IA wherein $R^1$ and $R^2$ are selected from $C_1$ to $C_6$ alkyl group; $R^3$ is selected from hydrogen, a linear or branched $C_1$ to $C_6$ alkyl group, and a $C_6$ to $C_{10}$ aryl group; wherein $R^1$ and $R^2$ are linked to form a cyclic ring structure or $R^1$ and $R^2$ are not linked to form a cyclic ring structure. Table 1 below shows structures of exemplary silicon precursors having an anchoring functionality, i.e. an organoamino group, and having a passivating functionally selected from an alkyl group which is preferably a methyl or Me group. Not bound by theory, it is believed that the Si-Me groups are more stable at temperatures higher than 500° C. than ethyl group and thus provide a passivation functionality to prevent further surface reaction, leading to a self-limiting ALD or ALD-like process, especially at temperature higher than 600° C.

TABLE 1

Organoaminodisilazane precursors having at least one anchoring functionality and at least one passivating functionality (e.g., 3 methyl groups) wherein $R^3$ is selected from hydrogen, methyl and ethyl which provides lower boiling point, thus allowing the organoaminodisilazane precursors to be easily delivered into a reactor chamber for deposition of silicon oxide

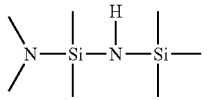

1-dimethylamino-1,1,3,3,3-pentamethyldisilazane

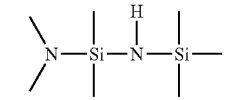

1-diethylamino-1,1,3,3,3-pentamethyldisilazane

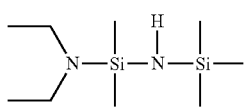

1-methylethylamino-1,1,3,3,3-pentamethyldisilazane

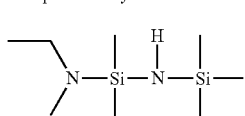

1-pyrrolidino-1,1,3,3,3-pentamethyldisilazane

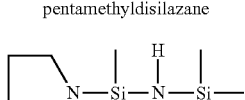

1-(2-methylpyrrolidino)-1,1,3,3,3-pentamethyldisilazane

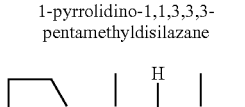

1-(2,5-dimethylpyrrolidino-1,1,3,3,3-pentamethyldisilazane

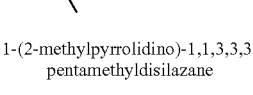

1-piperidino-1,1,3,3,3-pentamethyldisilazane

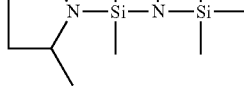

TABLE 1-continued

Organoaminodisilazane precursors having at least one anchoring functionality and at least one passivating functionality (e.g., 3 methyl groups) wherein $R^3$ is selected from hydrogen, methyl and ethyl which provides lower boiling point, thus allowing the organoaminodisilazane precursors to be easily delivered into a reactor chamber for deposition of silicon oxide 1-(2,5-dimethylpiperidino-1,1,3,3,3-pentamethyldisilazane

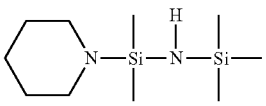

1-pyrrolyl-1,1,3,3,3-pentamethyldisilazane

1-imidazolyl-1,1,3,3,3-pentamethyldisilazane

1-dimethylamino-1,1,2,3,3,3-hexamethyldisilazane

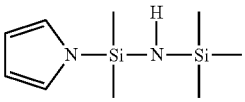

1-diethylamino-1,1,2,3,3,3-hexamethyldisilazane

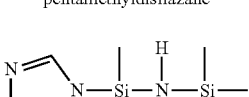

1-methylethylamino-1,1,2,3,3,3-hexamethyldisilazane

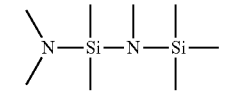

1-pyrrolidino-1,1,2,3,3,3-hexamethyldisilazane

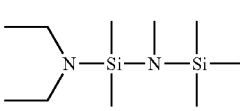

1-(2-methylpyrrolidino-1,1,2,3,3,3-hexamethyldisilazane

TABLE 1-continued

Organoaminodisilazane precursors having at least one anchoring functionality and at least one passivating functionality (e.g., 3 methyl groups) wherein $R^3$ is selected from hydrogen, methyl and ethyl which provides lower boiling point, thus allowing the organoaminodisilazane precursors to be easily delivered into a reactor chamber for deposition of silicon oxide

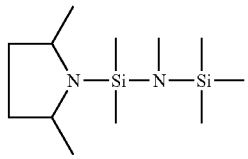 [SMILES: CC1CCC(C)N1[Si](C)(C)N(C)[Si](C)(C)C]

1-(2,5-dimethylpyrrolidino-1,1,2,3,3,3-hexamethyldisilazane

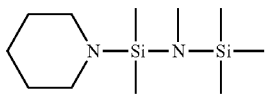

1-piperidino-1,1,2,3,3,3-hexamethyldisilazane

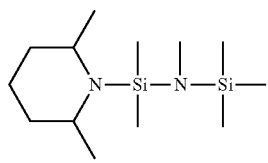

1-(2,5-dimethylpiperidino-1,1,2,3,3,3-hexamethyldisilazane

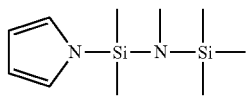

1-pyrrolyl-1,1,2,3,3,3-hexamethyldisilazane

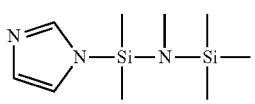

1-imidazolyl-1,1,2,3,3,3-hexamethyldisilazane

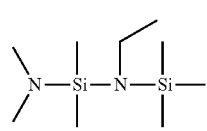

1-dimethylamino-2-ethyl-1,1,3,3,3-pentamethyldisilazane

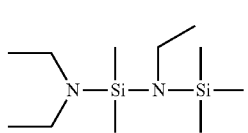

1-diethylamino-2-ethyl-1,1,3,3,3-pentamethyldisilazane

TABLE 1-continued

Organoaminodisilazane precursors having at least one anchoring functionality and at least one passivating functionality (e.g., 3 methyl groups) wherein $R^3$ is selected from hydrogen, methyl and ethyl which provides lower boiling point, thus allowing the organoaminodisilazane precursors to be easily delivered into a reactor chamber for deposition of silicon oxide

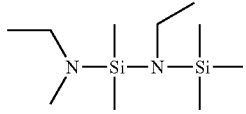

1-methylethylamino-2-ethyl-1,1,3,3,3-pentamethyldisilazane

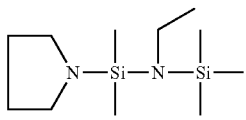

1-pyrrolidino-2-ethyl-1,1,3,3,3-pentamethyldisilazane

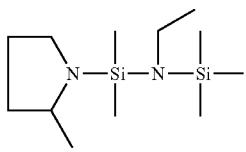 [SMILES: CCN([Si](C)(C)C)[Si](C)(C)N1CCCC1C]

1-(2-methylpyrrolidino-2-ethyl-1,1,3,3,3-pentamethyldisilazane

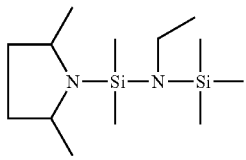 [SMILES: CCN([Si](C)(C)C)[Si](C)(C)N1C(C)CCC1C]

1-(2,5-dimethylpyrrolidino-2-ethyl-1,1,3,3,3-pentamethyldisilazane

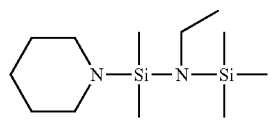 [SMILES: CCN([Si](C)(C)C)[Si](C)(C)N1CCCCC1]

1-piperidino-2-ethyl-1,1,3,3,3-pentamethyldisilazane

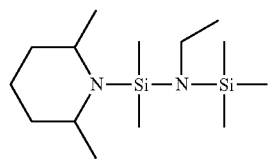 [SMILES: CCN([Si](C)(C)C)[Si](C)(C)N1C(C)CCCC1C]

1-(2,6-dimethylpiperidino-2-ethyl-1,1,3,3,3-pentamethyldisilazane

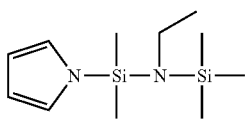

1-pyrrolyl-2-ethyl-1,1,3,3,3-pentamethyldisilazane

TABLE 1-continued

Organoaminodisilazane precursors having at least one anchoring functionality and at least one passivating functionality (e.g., 3 methyl groups) wherein $R^3$ is selected from hydrogen, methyl and ethyl which provides lower boiling point, thus allowing the organoaminodisilazane precursors to be easily delivered into a reactor chamber for deposition of silicon oxide

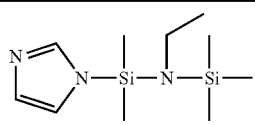

1-imidazolyl-2-ethyl-1,1,3,3,3-pentamethyldisilazane

The organoaminodisilazane compounds having Formulae I or IA can be synthesized, for example, by catalytic dehydrocoupling of asymmetrical disilazane or chlorinated asymmetrical disilazane with organoamines (e.g., equation (1) or (2)) below:

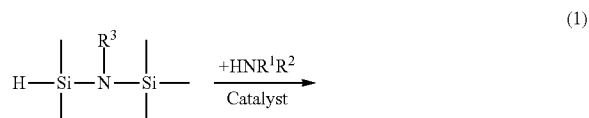

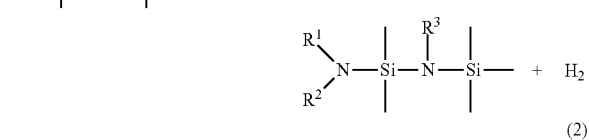

The asymmetrical or chlorinated asymmetrical disilazanes can be prepared, respectively, via treatment of symmetrical disilazanes with dimethylchlorosilane or dimethyldichloro-silane in Equation (3) below.

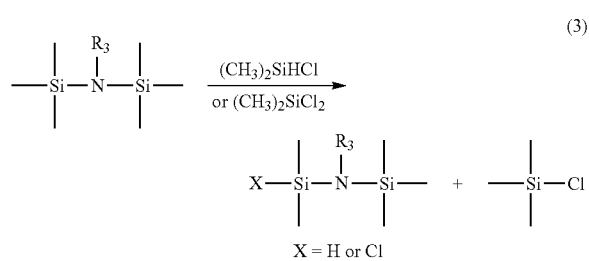

The catalyst employed in the method of the present invention in equation (1) is one that promotes the formation of a silicon-nitrogen bond. Exemplary catalysts that can be used with the method described herein include, but are not limited to the following: alkaline earth metal catalysts; halide-free main group, transition metal, lanthanide, and actinide catalysts; and halide-containing main group, transition metal, lanthanide, actinide catalysts, pure noble metals such as ruthenium platinum, palladium, rhodium, osmium can also be affixed to a support. The support is a solid with a high surface area. Typical support materials include but are not limited to: alumina, MgO, zeolites, carbon, Monolith cordierite, diatomaceous earth, silica gel, silica/alumina, ZrO and $TiO_2$. Preferred supports are carbon (for examples, platinum on carbon, palladium on carbon, rhodium on carbon, ruthenium on carbon) alumina, silica and MgO.

The organoaminodisilazane compounds having Formulae I or IA according to the present invention and compositions comprising the silicon precursor compounds having Formulae I or IA according to the present invention are preferably substantially free of halide ions. As used herein, the term "substantially free" as it relates to halide ions (or halides) such as, for example, chlorides (i.e. chloride-containing species such as HCl or silicon compounds having at least one Si—Cl bond) and fluorides, bromides, and iodides, means less than 5 ppm (by weight) measured by ion chromatography (IC), preferably less than 3 ppm measured by IC, and more preferably less than 1 ppm measured by IC, and most preferably 0 ppm measured by IC. Chlorides are known to act as decomposition catalysts for the organoaminodisilazane compounds having Formulae I or IA. Significant levels of chloride in the final product can cause the silicon precursor compounds to degrade. The gradual degradation of the organoaminodisilazane compounds may directly impact the film deposition process making it difficult for the semiconductor manufacturer to meet film specifications. In addition, the shelf-life or stability is negatively impacted by the higher degradation rate of the organoaminodisilazane compounds having Formulae I or IA thereby making it difficult to guarantee a 1-2 year shelf-life. Therefore, the accelerated decomposition of the organoaminodisilazane compounds having Formulae I or IA presents safety and performance concerns related to the formation of these flammable and/or pyrophoric gaseous byproducts. The organoaminodisilazane compounds having Formulae I or IA are preferably substantially free of metals. As used herein, the term "substantially free" as it relates to Li, Na, K, Mg, Ca, Al, Fe, Ni, Cr means less than 5 ppm (by weight), preferably less than 3 ppm, and more preferably less than 1 ppm, and most preferably 0.1 ppm as measured by ICP-MS. In some embodiments, the organoaminodisilazane compounds having Formula I or IA are free of metals The organoaminodisilazane compounds having Formulae I or IA preferably have a purity of 98 wt. % or higher, more preferably 99 wt. % or higher as measured by GC when used as precursor to deposit high quality silicon oxide or carbon doped silicon oxide.

Another embodiment of the method described herein introduces a hydroxyl or OH source such as $H_2O$ vapor after the oxidizing step. The goal in this embodiment to repopulate the anchoring functionality or reactive sites for organoaminodisilazane which anchor on the surface to form the monolayer. The deposition steps are comprised of:
 a. providing a substrate in a reactor
 b. introducing into the reactor one organoaminodisilazane precursor described above
 c. purging the reactor with purge gas
 d. introducing oxidizer into the reactor
 e. purging the reactor with purge gas
 f. introducing water vapor or hydroxyl source into the reactor; and
 g. purging the reactor with purge gas
wherein steps b through g are repeated until desired thickness is deposited.

In an alternative embodiment of the method described herein, the deposition steps are comprised of:
a. providing a substrate in a reactor
b. introducing into the reactor one organoaminodisilazane precursor described above
c. purging reactor with purge gas
d. introducing oxygen source into the reactor
e. purging the reactor with purge gas
f. introducing water vapor or OH source into the reactor; and
g. purging the reactor with purge gas
wherein steps b through i are repeated until desired thickness is deposited.

Yet another embodiment employs hydrogen peroxide or oxygen plasma to remove a passivating functionality or group such as methyl. The deposition steps are as follows:
a. providing a substrate in a reactor
b. introducing into the reactor one organoaminodisilazane precursor described above
c. purging the reactor with purge gas
d. introducing ozone, hydrogen peroxide or oxygen plasma into the reactor; and
e. purging the reactor with purge gas
wherein steps b through e are repeated until desired thickness is deposited Process temperature for the method described herein are one or more temperatures ranging from 500° C. to 1000° C.; or 500° C. to 750° C.; or 600° C. to 750° C.; or 600° C. to 800° C. or 650° C. to 800° C.

Deposition pressure ranges are one or more pressures ranging from 50 miliTorr (mT) to 760 Torr, or from 500 mT-100 Torr. Purge gas can be selected from inert gas such as nitrogen, helium or argon. Oxidizer is selected from oxygen, a composition comprising oxygen and hydrogen, hydrogen peroxide, ozone or molecular oxygen from plasma process.

EXAMPLES

Example 1: Preparation of 1-dimethylamino-1,1,2,3,3,3-hexamethyldisilazane

Dimethyldichlorosilane (1.13 mol, 146 g) was added to heptamethyldisilazane (1.13 mol, 198 g) via an addition funnel in a 1 L flask. The mixture was stirred and heated to about 60° C. The reaction mixture was subjected to distillation when the reaction was compete as determined by GC analysis. 157 g of 1-chloro-1,1,2,3,3,3-hexamethyldisilazane was obtained under the reduce pressure (68° C./25 torr) with a yield of 71%.

A solution of dimethylamine (2 M) in THF (1.0 mol, 500 mL) was slowly added via an addition funnel to a mixture of 1-chloro-1,1,2,3,3,3-hexamethyldisilazane (0.67 mol, 131 g), triethylamine (0.80 mol, 81 g) and hexanes. Once the addition was finished, the resulting slurry was stirred and then heated around 50° C. for 2 hours. The mixture was filtered, the solvent removed under reduced pressure, and the crude product purified by distillation to provide 93.0 g (b. p. 185° C.) of 1-dimethylamino-1,1,2,3,3,3-hexamethyldisilazane with a yield of 68%.

Comparable Example 2: Atomic Layer Deposition of Silicon Oxide Films with Dimethylaminotrimethylsilane Atomic layer deposition of silicon oxide films were conducted using the following silicon precursor: dimethylaminotrimethylsilane (DMATMS). The depositions were performed on a laboratory scale ALD processing tool. The silicon precursor was delivered to the chamber by vapor draw. All gases (e.g., purge and reactant gas or precursor and oxygen source) were preheated to 100° C. prior to entering the deposition zone. Gases and precursor flow rates were controlled with ALD diaphragm valves with high speed actuation. The substrates used in the deposition were 12 inch long silicon strips. A thermocouple was attached on the sample holder to confirm substrate temperature. Depositions were performed using ozone as oxygen source gas. Deposition parameters are provided in Table 2.

TABLE 2

Process for Atomic Layer Deposition of Silicon Oxide Films with Ozone Using DMATMS.

| Step 1 | 6 sec | Evacuate reactor | <100 mT |
| Step 2 | Variable | Dose Silicon precursor | Reactor pressure typically <2 Torr |
| Step 3 | 6 sec | Purge reactor with nitrogen | Flow 1.5 slpm $N_2$ |
| Step 4 | 6 sec | Evacuate reactor | <100 mT |
| Step 5 | 4 sec | Dose Ozone, 16-20% wt | |
| Step 6 | 6 sec | Purge reactor with nitrogen | Flow 1.5 slpm $N_2$ |

Steps 2 to 6 were repeated until a desired thickness is reached. Thickness and refractive indices of the films were measured using a FilmTek 2000SE ellipsometer by fitting the reflection data from the film to a pre-set physical model (e.g., the Lorentz Oscillator model). Wet etch rate was performed using 1 wt % solution of 49 wt % hydrofluoric (HF) acid in deionized water. Thermal oxide wafers were used as reference for each batch to confirm solution concentration. Typical thermal oxide wafer wet etch rate for 1 wt % HF in $H_2O$ solution is 0.5 Å/s. Film thickness before and after etch was used to calculate wet etch rate. Carbon and nitrogen concentration in the films were analyzed with Dynamic Secondary Ions Mass Spectrometry (SIMS) technique. The % non-uniformity was calculated from 6-point measurements using the following equation: % non-uniformity=((max−min)/(2*mean)). Film density was characterized with X-ray reflectometry (XRR). Table 3 summarizes $SiO_2$ films properties deposited with a fixed dose (8 seconds) of the DMATMS precursor at a wafer temperature ranging from 600 to 650° C.

TABLE 3

Silicon Oxide Film Properties Deposited with DMATMS

| Wafer temperature (° C.) | Deposition Rate (Å/cycle) | Non-uniformity (%) | WER (Å/s) | C concentration (atoms/cc) | N concentration (atoms/cc) |
| --- | --- | --- | --- | --- | --- |
| 600 | 1.25 | 0.8 | 2.18 | 3.49E+19 | 2.49E+18 |
| 650 | 1.32 | 1.0 | 2.07 | 2.25E+19 | 2.51E+18 |

Film densities for silicon oxides deposited from DMATMS ranged from 2.08 to 2.23 g/cc.

Example 3. Precursor Thermal Stability of 1-dimethylamino-1,1,2,3,3,3-hexamethyldisilazane vs DMATMS 1-dimethylamino-1,1,2,3,3,3-hexamethyldisilazane and DMATMS as the silicon precursors were introduced into an ALD chamber in following steps: (a) introducing the silicon precursor for 12 seconds; (b) purge with nitrogen. Steps (a) and (b) were repeated for 300 cycles. Thickness and Refractive Indices (RI) of the films were measured using a FilmTek 2000SE ellipsometer by fitting the reflection data from the film to a pre-set physical model (e.g., the Lorentz Oscillator model). Table 4 summarizes the film formed by thermal deposition of the silazane precursors at substrate temperatures of 600° C. and 650° C. respectively, demonstrating 1-dimethylamino-1,1,2,3,3,3-hexamethyldisilazane has slightly less decomposition than DMATMS, and thus it is a better precursor for high temperature ALD application.

TABLE 4

Thermal Decomposition of the Silazane Precursor vs DMATMS

| Silicon Precursor | Film Thickness at 600 ° C. (Å) | Film Thickness at 650 ° C. (Å) |
| --- | --- | --- |
| 1-dimethylamino-1,1,2,3,3,3-hexamethyldisilazane | 23 | 108 |
| DMATMS | 44 | 132 |

Example 4. Atomic Layer Deposition of Silicon Oxide Films with 1-dimethylamino-1,1,2,3,3,3-hexamethyldisilazane Atomic layer deposition of silicon oxide films were conducted using the following silicon precursor: 1-dimethylamino-1,1,2,3,3,3-hexamethyldisilazane. The depositions were performed on the laboratory scale ALD processing tool. The silicon precursor was delivered to the chamber by vapor draw. Deposition process and parameters are provided in Table 2. Steps 2 to 6 are repeated for 500 cycles until a desired thickness is reached. The process parameters of the depositions, the deposition rate, refractive index and WER using 1% solution of 49% hydrofluoric (HF) acid in deionized water are provided in Table 5.

TABLE 5

Summary of Process Parameters and Results for 1-dimethylamino-1,1,2,3,3,3-hexamethyldisilazane

| Wafer temperature (° C.) | Precursor dose (seconds) | Ozone dose (seconds) | Refractive Index | Deposition Rate (Å/cycle) | WER (Å/s) |
| --- | --- | --- | --- | --- | --- |
| 600 | 12 | 10 | 1.44 | 1.40 | 1.59 |
| 650 | 12 | 10 | 1.44 | 1.57 | 1.36 |

It can be seen that the silicon precursor, 1-dimethylamino-1,1,2,3,3,3-hexamethyldisilazane, provides slightly higher deposition rate (Å/cycle) and lower WER than DMATMS at a given temperature.

Although the disclosure has been described with reference to certain preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments, but that the invention will include all embodiments falling within the scope of the appended claims.

The invention claimed is:

1. A composition for depositing a silicon oxide film or a carbon doped silicon oxide film using a vapor deposition process, wherein the composition comprises at least one silicon precursor having a structure represented by Formula IA:

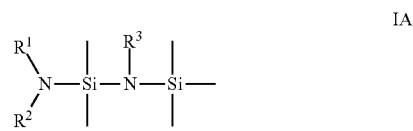

wherein $R^1$ and $R^2$ are selected from a $C_1$ to $C_6$ alkyl group; $R^3$ is selected from a linear or branched $C_2$ to $C_6$ alkyl group, and a $C_6$ to $C_{10}$ aryl group; and either $R^1$ and $R^2$ are linked to form a cyclic ring structure or $R^1$ and $R^2$ are not linked to form a cyclic ring structure.

2. The composition of claim 1, wherein the at least one silicon precursor is selected from the group consisting of 1-dimethylamino-2-ethyl-1,1,3,3,3-pentamethyldisilazane, 1-diethylamino-2-ethyl-1,1,3,3,3-pentamethyldisilazane, 1-methylethylamino-2-ethyl-1,1,3,3,3-pentamethyldisilazane, 1-pyrrolidino-2-ethyl-1,1,3,3,3-pentamethyldisilazane, 1-(2-methylpyrrolidino)-2-ethyl-1,1,3,3,3-pentamethyldisilazane, 1-2,5-dimethylpyrrolidino-2-ethyl-1,1,3,3,3-pentamethyldisilazane, 1-piperidino-2-ethyl-1,1,3,3,3-pentamethyldisilazane, 1-(2,6-dimethylpiperidino)-2-ethyl-1,1,3,3,3-pentamethyldisilazane, 1-pyrrolyl-2-ethyl-1,1,3,3,3-pentamethyldisilazane, 1-imidazolyl-2-ethyl-1,1,3,3,3-pentamethyldisilazane, and combinations thereof.

3. The composition of claim 1 wherein the at least one silicon precursor is substantially free of one or more impurities selected from the group consisting of a halide, metal ions, metal, and combinations thereof.

4. The composition of claim 3 wherein the composition is substantially free of one or more impurities selected from the group consisting of halide compounds, metal ions, metal, and combinations thereof.

5. The composition of claim 4, wherein the halide compounds comprise chloride-containing species.

6. The composition of claim 5, wherein the chloride concentration is less than 50 ppm measured by IC.

7. The composition of claim 5, wherein the chloride concentration is less than 10 ppm measured by IC.

8. The composition of claim 5, wherein the chloride concentration is less than 5 ppm measured by IC.

* * * * *